(12) United States Patent
Robbins (10) Patent No.: US 10,560,688 B2
(45) Date of Patent: Feb. 11, 2020

(54) DISPLAY DEVICE SYSTEM WITH NON-TELECENTRIC IMAGING TO PREVENT GHOST IMAGES

(71) Applicant: Microsoft Technology Licensing, LLC, Redmond, WA (US)

(72) Inventor: Steven John Robbins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 15/627,093

(22) Filed: Jun. 19, 2017

(65) Prior Publication Data

US 2018/0338131 A1    Nov. 22, 2018

Related U.S. Application Data

(60) Provisional application No. 62/509,441, filed on May 22, 2017.

(51) Int. Cl.
*G02B 27/01* (2006.01)
*G06F 3/01* (2006.01)
(Continued)

(52) U.S. Cl.
CPC ......... *H04N 13/383* (2018.05); *G02B 27/017* (2013.01); *G06F 3/011* (2013.01);
(Continued)

(58) Field of Classification Search
CPC .. H04N 13/383; H04N 13/279; H04N 13/344; G02B 27/017; G02B 27/0172;
(Continued)

(56) References Cited

U.S. PATENT DOCUMENTS 6,333,820 B1   12/2001   Hayakawa et al.
6,563,648 B2   5/2003   Gleckman et al.
(Continued)

OTHER PUBLICATIONS

"International Search Report and Written Opinion Issued in PCT Application No. PCT/US2018/028973", dated Jul. 30, 2018, 11 Pages.

(Continued)

*Primary Examiner* — Collin X Beatty
(74) *Attorney, Agent, or Firm* — Arent Fox LLP (57) ABSTRACT

A non-telecentric display system that prevents ghost images includes an optical waveguide and a display engine. An image former of the display engine includes a reflective surface having a surface normal thereto. An illumination engine of the display engine emits light towards the reflective surface of the image former such that chief rays are offset by acute angles from the surface normal to the reflective surface. The display engine directs light corresponding to an image, that reflects off the reflective surface of the image former, towards an input-coupler of the optical waveguide so light corresponding to the image is coupled therein and travels by total internal reflection to an output-coupler of the waveguide. Ghost images are prevented at least in part due to the chief rays of light emitted by the illumination engine being offset by acute angles from the surface normal to the reflective surface.

19 Claims, 6 Drawing Sheets

(51) Int. Cl.
    *H04N 13/383*     (2018.01)
    *G06T 11/80*     (2006.01)
    *H04N 13/279*     (2018.01)
    *H04N 13/344*     (2018.01)

(52) U.S. Cl.
    CPC ............ *G06F 3/017* (2013.01); *G06T 11/80* (2013.01); *H04N 13/279* (2018.05); *G02B 2027/0138* (2013.01); *G02B 2027/0178* (2013.01); *G02B 2027/0187* (2013.01); *H04N 13/344* (2018.05)

(58) Field of Classification Search
    CPC ...... G02B 2027/012; G02B 2027/0138; G02B 2027/0178; G02B 2027/0187; G06F 3/011; G06F 3/017; G06T 11/80
    USPC .......................................... 359/630
    See application file for complete search history.

(56) References Cited

U.S. PATENT DOCUMENTS

| | | |
|---|---|---|
| 6,877,859 B2 | 4/2005 | Silverstein et al. |
| 7,120,309 B2 | 10/2006 | Garcia |
| 7,643,214 B2 | 1/2010 | Amitai |
| 9,052,505 B2 | 6/2015 | Cheng et al. |
| 9,069,180 B2 | 6/2015 | Amitai |
| 9,274,338 B2 | 3/2016 | Robbins et al. |
| 9,310,591 B2 | 4/2016 | Hua et al. |
| 9,406,166 B2 | 8/2016 | Futterer |
| 2005/0140644 A1 | 6/2005 | Mukawa |
| 2012/0287374 A1 | 11/2012 | Mukawa |
| 2014/0368797 A1 | 12/2014 | Ferri et al. |
| 2015/0260994 A1* | 9/2015 | Akutsu .................. G02B 6/34 359/567 |
| 2016/0154242 A1 | 6/2016 | Border |
| 2016/0282629 A1 | 9/2016 | Takagi et al. |

OTHER PUBLICATIONS

Cakmakci, et. al., "A Compact Optical See-through Head-Worn Display with Occlusion Support", in Proceedings of the 3rd IEEE/ACM International Symposium on Mixed and Augmented Reality, Nov. 2, 2004, 10 pages.

* cited by examiner

DISPLAY DEVICE SYSTEM WITH NON-TELECENTRIC IMAGING TO PREVENT GHOST IMAGES

PRIORITY CLAIM

This application claims priority to U.S. Provisional Patent Application No. 62/509,441, filed May 22, 2017.

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image produced by a display engine to a location where a user of a device can view the image as a virtual image in an augmented reality environment. As this is still an emerging technology, there are certain challenges associated with utilizing waveguides to display images of virtual objects to a user.

SUMMARY

Certain embodiments of the present technology relate to apparatuses, methods and systems for mitigating ghost images in see-through, mixed reality display device systems. In accordance with an embodiment, a see-through, mixed reality display device system includes a display engine and an optical waveguide. The display engine includes an image former and an illumination engine, wherein the image former includes a reflective surface having a surface normal thereto. For example, the image former can be a liquid crystal on silicon (LCoS) microdisplay, and the reflective surface of the image former can include a plurality of pixels that can each be selectively and individually turned on or off. The illumination engine is configured to emit light towards the reflective surface of the image former such that chief rays of the light emitted by the illumination engine towards the reflective surface of the image former are offset by acute angles from the surface normal to the reflective surface of the image former. The display engine is configured to direct light corresponding to an image, that reflects off the reflective surface of the image former, towards an input-coupler of the optical waveguide such that at least a portion of the light corresponding to the image is coupled into the optical waveguide by the input-coupler and travels at least in part by way of total internal reflection (TIR) to an output-coupler where the least a portion of the light corresponding to the image is out-coupled from the optical waveguide. The image former, the illumination engine and the optical waveguide collectively provide a non-telecentric imaging display system. In accordance with certain embodiments, the display system has a numeric aperture that is slightly less than half a numeric aperture that the display system would have if the display system included a lens system that was normally rotationally symmetric about an optical axis of the lens system.

In accordance with certain embodiments, the light emitted by the illumination engine, after reflecting off the reflective surface of the image former for a first time, travels a first set of paths toward the input-coupler of the optical waveguide. The display engine and the optical waveguide are positioned relative to one another such that a portion of the light corresponding to the image that is directed by the display engine towards the input-coupler of the optical waveguide is reflected-back toward the display engine due to Fresnel reflections and reflect for a second time off the reflective surface of the image former. The light corresponding to the image that reflect for the second time off the reflective surface of the image former travel a second set of paths back towards the optical waveguide, after being reflected for the second time. The second set of paths are different than the first set of paths, due to the chief rays of the light emitted by the illumination engine towards the reflective surface of the image former being offset by the acute angles from the surface normal to the reflective surface of the image former.

In accordance with certain embodiments, the display engine further includes an aperture stop that blocks, from being incident on the input-coupler of the optical waveguide, the light corresponding to the image that reflects for the second time off the reflective surface of the image former and travels the second set of paths back towards the optical waveguide after being reflected for the second time, thereby preventing the reflected-back light from causing ghost images. In accordance with certain embodiments, the display engine has an exit-pupil adjacent to the input-coupler of the optical waveguide, and the aperture stop blocks a portion of the exit-pupil of the display engine.

In accordance with certain embodiments, the illumination engine includes a light source and one or more lens groups and/or other optical elements that are configured to cause the chief rays of the light emitted by the illumination engine towards the reflective surface of the image former to be offset by the acute angles from the surface normal to the reflective surface of the image former. The display system can also include a polarizing beam splitter (PBS) positioned between the illumination engine and the image former, as well as one or more lens groups between the PBS and an exit-pupil of the display engine.

In accordance with certain embodiments, all lens groups within the display system share a common optical axis that is orthogonal to a center of a field of view of the display system. Alternatively, one or more lens groups within the display system is decentered and/or tilted relative to an optical axis that can be orthogonal to a center of a field of view of the display system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 also shows an eye that is viewing the image within an eye box that is proximate an output-coupler of the optical waveguide.

DETAILED DESCRIPTION

Certain embodiments of the present technology, as noted above, related to apparatuses, methods and systems for mitigating ghost images in see-through, mixed reality display device systems that include a display engine and an optical waveguide.

In the description that follows, like numerals or reference designators will be used to refer to like parts or elements throughout. In addition, the first digit of a three digit reference number identifies the drawing in which the reference number first appears.

Figure 1A:
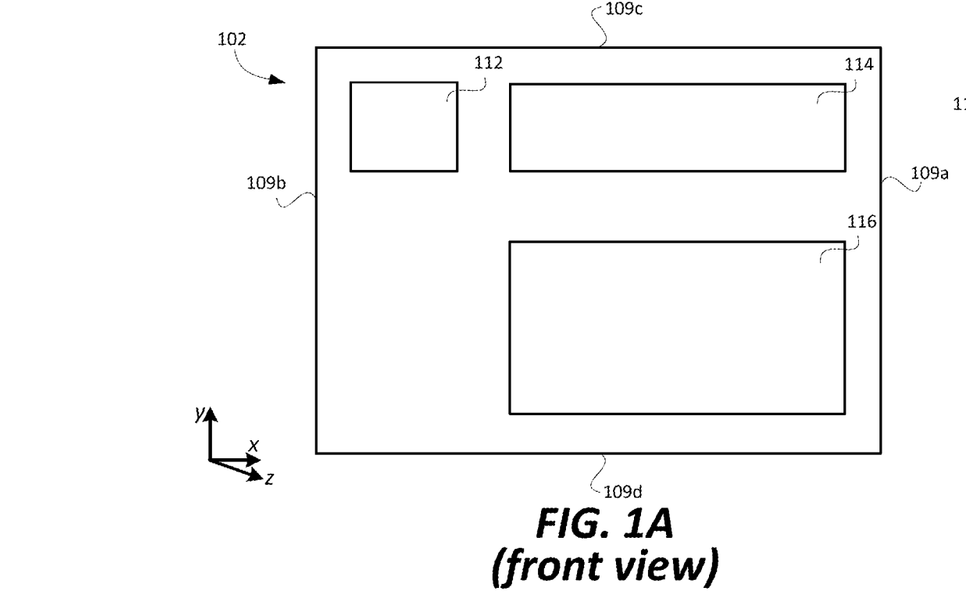
FIGS. 1A, 1B and 1C are front, top and side views, respectively, of an exemplary optical waveguide that can be used to replicate an image associated with an input-pupil to an expanded output-pupil.
Figure 1B:
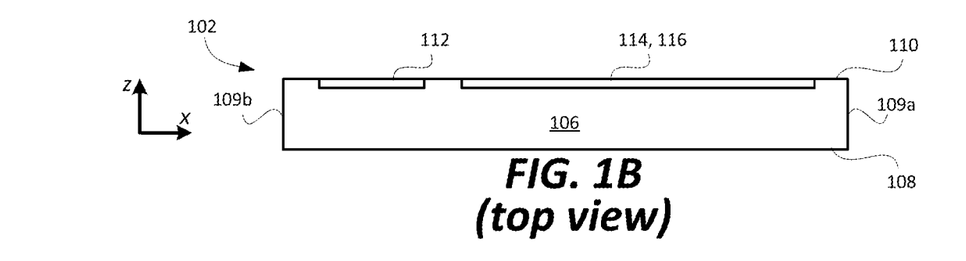
Figure 1C:
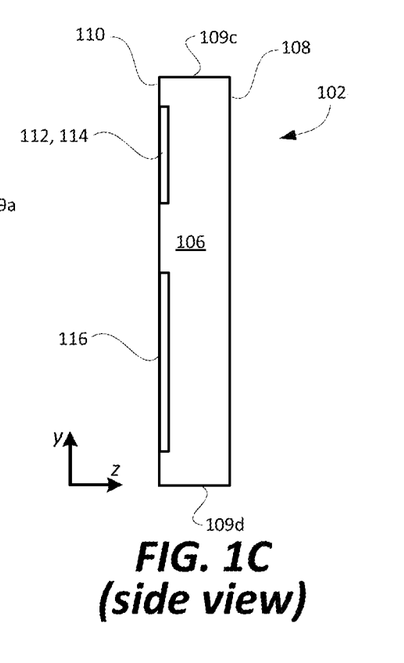

FIGS. 1A, 1B and 1C are front, top and side views, respectively, of an exemplary optical waveguide 102 that can be used to replicate an image associated with an input-pupil to an expanded output-pupil. The term "input-pupil," as used herein when discussing a waveguide, refers to an aperture through which light corresponding to an image is overlaid on an input-coupler of a waveguide. The term "output-pupil," as used herein when discussing a waveguide, refers to an aperture through which light corresponding to an image exits an output-coupler of a waveguide. An input-pupil is sometimes also referred to as an entrance-pupil, and an output-pupil is sometimes also referred to as an exit-pupil. The optical waveguide 102 will often be referred to hereafter more succinctly simply as a waveguide 102. As will be discussed in further detail below with reference to FIG. 2, the image that the waveguide 102 is being used to replicate, and likely also expand, can be generated using a display engine. When used within a see-through, mixed reality display device system, the waveguide 102 can be used as an optical combiner that is configured to combine the light corresponding to a virtual image (that is output from a display engine) with light corresponding to an external scene. Where the waveguide relies on diffractive optical elements to couple light into the waveguide and/or out of the waveguide, the waveguide may be referred to as a diffractive waveguide. Such a diffractive waveguide can be used as a diffractive optical combiner.

Referring to FIGS. 1A, 1B and 1C, the optical waveguide 102 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 102 from the input-coupler 112 to the output-coupler 116, out of the waveguide 102 so that the light is output and viewable from the output-pupil.

The bulk-substrate 106, which can be made of glass or optical plastic, but is not limited thereto, includes a first major side 108, a second major side 110, and peripheral sides 109a, 109b, 109c and 109d. The first major side 108 and the second major side 110 are opposite and parallel to one another. In accordance with certain embodiments, the major sides 108 and 110 are planar. In accordance with other embodiments, the major sides 108 and 110 are curved. The first major side 108 can alternatively be referred to as the front-side 108, and the second major side 110 can alternatively be referred to as the back-side 110. The peripheral sides 109a, 109b, 109c and 109d can be referred to individually as a peripheral side 109, or collectively as the peripheral sides 109. As the term "bulk" is used herein, a substrate is considered to be "bulk" substrate where the thickness of the substrate (between its major sides) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major sides) is at least 6200 nm, i.e., at least 6.2 μm. In accordance with certain embodiments, the bulk-substrate 106 has a thickness of at least 25 μm between its major sides 108 and 110. In specific embodiments, the bulk-substrate 106 has a thickness (between its major sides) within a range of 25 μm to 1020 μm. The bulk-substrate 106, and more generally the waveguide 102, is transparent, meaning that it allows light to pass through it so that a user can see through the waveguide 102 and observe objects on an opposite side of the waveguide 102 than the user's eye(s).

The optical waveguide 102 in FIGS. 1A, 1B and 1C is also shown as including an intermediate-component 114, which can alternatively be referred to as an intermediate-zone 114. Where the waveguide 102 includes the intermediate-component 114, the input-coupler 112 is configured to couple light into the waveguide 102 (and more specifically, into the bulk-substrate 106 of the waveguide 102) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion.

The input-coupler 112, the intermediate-component 114 and the output-coupler 116 can be referred to collectively herein as optical components 112, 114 and 116 of the waveguide, or more succinctly as components 112, 114 and 116. Where the optical components 112, 114 and 116 are diffractive gratings, they can be referred to as diffractive optical elements (DOEs) 112, 114 and 116, or more specifically, as a diffractive input-coupler 112, a diffractive intermediate-component 114 and a diffractive output-coupler 116.

It is possible that a waveguide includes an input-coupler and an output-coupler, without including an intermediate-component. In such embodiments, the input-coupler would be configured to couple light into the waveguide and in a direction toward the output-coupler. In such embodiments, the output-coupler can provide one of horizontal or vertical pupil expansion, depending upon implementation. It is also possible that a waveguide include more than one intermediate-component.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same side (i.e., the back-side 110) of the waveguide 102. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side 110 of the waveguide 102. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major sides 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major sides 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side 108 of the waveguide 102, another one of the components 112, 114 and 116 is provided in or on the back-side 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major sides 108 or 110 of the bulk-substrate 106, or embedded therebetween.

The input-coupler 112 can alternatively be implemented as a prism, a reflective polarizer or can be mirror based. Similarly, the output-coupler 116 can alternatively be implemented as a prism, a reflective polarizer or can be mirror based. Depending upon the specific configuration and implementation, any one of the input-coupler 112, the intermediate-component 114 and the output-coupler 116 can be reflective, diffractive or refractive, or a combination thereof, and can be implemented, e.g., as a linear grating type of coupler, a holographic grating type of coupler, a prism or another type of optical coupler. The intermediate-component 114 can be implemented using a fold-grating, or can alternatively be implemented as a mirror based pupil expander, but is not limited thereto. More generally, the input-coupler 112, the intermediate-component 114 and the output-coupler 116 can have various different outer peripheral geometries, can be provided in or on either of the major sides of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 116, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

The concept of light traveling through the waveguide 102, from the input-coupler 112 to the output-coupler 116, by way of TIR, can be better appreciated from FIG. 2, which is discussed below.

Figure 2:
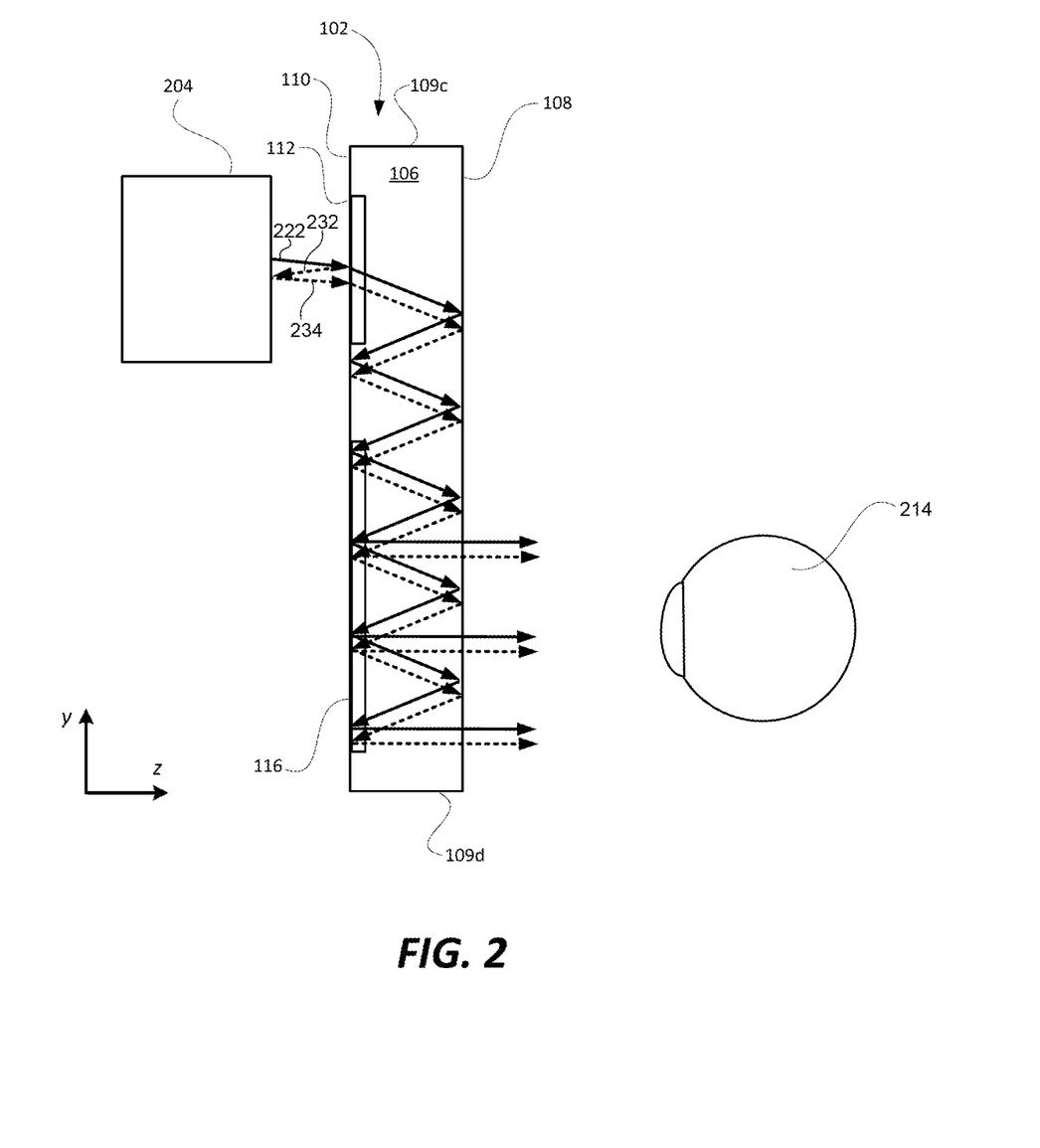
FIG. 2 is side view of an exemplary see-through, mixed reality display system that includes an optical waveguide (which is the same or similar to the waveguide introduced with reference to FIGS. 1A, 1B and 1C) and a display engine that generates an image including angular content that is coupled into the waveguide by an input-coupler of the optical waveguide.

Referring now to FIG. 2, as in FIG. 1C, FIG. 2 shows a side view of the waveguide 102, but also shows a display engine 204 that generates an image including angular content that is coupled into the waveguide by the input-coupler 112. Also shown in FIG. 2, is representation of a human eye 214 that is using the waveguide 102 to observe an image, produced using the display engine 204, as a virtual image. More generally, FIG. 2 shows an exemplary see-through, mixed reality display system 200.

The display engine 204 can include an image former and an illumination engine, among other elements. Exemplary details of such a display engine 204 are described below with reference to FIG. 3A. The image former of the display engine 204, which can be configured to produce light corresponding to an image, can be implemented using a reflective technology for which external light, produced by an illumination engine, is reflected and modulated by an optically active material. Digital light processing (DLP), liquid crystal on silicon (LCoS) and Mirasol™ display technology from Qualcomm, Inc. are all examples of reflective technologies. Where the image former is an LCoS microdisplay, it includes a reflective display surface including pixels that can be in an "on" state or an "off" state, as controlled by electronics (not shown). Other types of image formers that rely on reflective technology can similarly have a reflective display surface, which an be referred to herein more succinctly as a reflective surface.

The image former of the display engine 204 can alternatively be implemented using a transmissive projection technology where a light source is modulated by an optically active material, and backlit with white light. These technologies are usually implemented using liquid crystal display (LCD) type displays with powerful backlights and high optical energy densities. The illumination engine of the display engine 204 can provide the aforementioned backlighting. Alternatively, the image former of the display engine 204 can be implemented using an emissive technology where light is generated by a display, see for example, a PicoP™ display engine from Microvision, Inc. Another example of emissive display technology is a micro organic light emitting diode (OLED) display. Companies such as eMagin™ and Microoled™ provide examples of micro OLED displays. The image former of the display engine 204, alone or in combination with the illumination engine, can also be referred to as a micro display.

As can be appreciated from FIG. 3A discussed below, the display engine 204 can include one or more lens groups. Such lens group(s) can be arranged to receive a diverging display image from the image former, to collimate the display image, and to direct the collimated image toward the input-coupler 112 of the waveguide 102. More generally, the one or more lens groups can be configured to collimate light corresponding to an image, produced by an image former, and thereafter output the light corresponding to the image from the display engine 204. Lens group(s) can also be used to collimate light emitted by a light source before such light is directed towards an image former. In accordance with an embodiment, an input-pupil associated with the waveguide 102 may be approximately the same size as an exit-pupil associated with the display engine, e.g., 5 mm or less in some embodiments, but is not limited thereto.

In FIG. 2, the display engine 204 is shown as facing the back-side 110 of the waveguide 102, and the eye 214 is shown as facing the front-side 108 opposite and parallel to the back-side 110. This provides for a periscope type of configuration in which light enters the waveguide on one side of the waveguide 102, and exits the waveguide at an opposite side of the waveguide 102. Alternatively, the input-coupler 112 and the output-coupler 116 can be implemented in a manner such that the display engine 204 and the eye 214 are proximate to and face a same major side (108 or 110).

The waveguide 102 can be incorporated into a see-through mixed reality display device system, in which case it can function as an optical combiner that combines light corresponding to the image, that is output from the display engine 204, with light corresponding to an external scene that is on the opposite side of the waveguide than a user's eye. A separate instance of the waveguide 102 and the display engine 204 can be provided for each of the left and right eyes of a user. In certain embodiments, such waveguide(s) 102 may be positioned next to or between see-through lenses, which may be standard lenses used in eye glasses and can be made to any prescription (including no prescription). The same waveguide can be used to steer light of multiple different colors (e.g., red, green and blue) associated with an image from the input-coupler to the output-coupler. Alternatively, three waveguides can be stacked adjacent to each other, with each of the waveguides being used to steer light of a different colors (e.g., red, green or blue) associated with an image from its respective input-coupler to its output-coupler. It would also be possible that one waveguide handle light of two colors (e.g., green and blue) and another waveguide handles light of a third color (e.g., red). Other variations are also possible.

Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

Light corresponding to an image that is coupled into the waveguide 102 by the input-coupler 112, can travel by way of TIR from the input-coupler 112 to the intermediate-component 114, and by way of TIR from the intermediate-component 114 to the output-coupler 116, where it exits the waveguide 102. More specifically, a combination of diffractive beam splitting and TIR within the waveguide 102 results in multiple versions of an input beam of light being outwardly diffracted from the output-coupler 116 in both the length and the width of the output-coupler 116.

In FIG. 2, the solid arrowed line 222 is representative of light corresponding to an image that is output by the display engine 204 and is incident on the input-coupler 112, which as noted above, can be a diffractive input-coupler 112, such as an SRG. Preferably, all of the light corresponding to an image (represented by the solid arrowed line 222) that is output from the display engine 204 is diffracted or otherwise input into the optical waveguide 102 by the input-coupler 112, and travels by way of TIR to the output-coupler 116, where the light (corresponding to the image) is coupled out of the optical waveguide 102 so that the image can be viewed by the human eye 214. However, what typically occurs, is that a portion of the light corresponding to the image that is output from the display engine 204 is reflected-back toward the display engine 204 due to Fresnel reflections. Such light can cause an undesirable ghost image of a virtual image presented to a user's eye by the optical waveguide. The dashed arrowed line 232 is representative of the reflected-back light. Some light that is output by the display engine 204 may also be reflected-back towards the display engine 204 because the light, after being diffracted into the optical waveguide 102 by the input-coupler 112, internally reflects off of an internal surface of the waveguide and is incident on the input-coupler 112 and is then undesirably diffractively out-coupled by the input-coupler 112 back into the display engine 204. Such light can also cause an undesirable ghost image of a virtual image presented to a user's eye by the optical waveguide.

The reflected-back light 232, after re-entering the display engine 204, can be incident on the image former therein and then reflected off the image former 206 a second time. The dashed arrowed line 234 is representative of the reflected-back light 232 after it has been reflected off of the image former within the display engine 204 the second time. Where the image former is implemented using a reflective technology (e.g., such as an LCoS microdisplay), substantially all of the reflected-back light 232 that is incident on the image former will be reflected therefrom. Where the image former is implemented using other technologies (e.g., a transmissive or emissive technology), at least some of the reflected-back light 232 that is incident on the image former will be reflected therefrom, but likely to a lesser degree than would occur if the image former were implemented using a reflective technology. Regardless of the type of image former, at least some of the reflected-back light 232, after being incident on the image former can be reflected off of the image former and incident again on the input-coupler 112 of the waveguide 102, as indicated by the dashed arrowed line 234. In FIG. 2 the light represented by the dashed arrowed line 234 is shown as being coupled into the waveguide 102 (or more specifically, the bulk-substrate 106 thereof) and traveling at least in part by way of TIR to the output-coupler 116, where the light represented by the dashed arrowed line 234 is coupled out of the optical waveguide 102 and viewable by the human eye 232 as an undesirable ghost image of a virtual image presented to a user's eye by the optical waveguide. Such a ghost image is essentially a replica of the desired virtual image that is offset in position and super imposed on top of the desired virtual image.

One potential solution for eliminating (or at least mitigating) ghost images would be to tilt the optical waveguide 102 relative to the display engine 204, such that that light that is undesirably reflected-back and/or diffractively out-coupled from the optical waveguide 102 (such as the light represented by the dashed line 232) is reflected-back at such an angle, relative to the display engine 204, that the light does not make it back to the image former. However, there are limitations to that solution. More specifically, tilting the optical waveguide 102 relative to the display engine 204 can have the undesirable effect of limiting the field of view (FOV) that can be achieved. Further, tilting the optical waveguide 102 relative to the display engine 204 can adversely affect the form factor and/or industrial design of the resulting display system, which may be very important where the display system is, for example, a head mounted near eye display system. Additionally, there is only so far that the optical waveguide 102 can be tilted relative to the display engine 204 before a diffractive input-coupler 112 will no longer meet design constraints and TIR requirements. Moreover, it is more challenging to align a tilted waveguide relative to an image former than it is to align a non-tilted waveguide related to an image former. Certain embodiments of the present technology, which are described below, provide for a more eloquent solution for eliminating (or at least mitigating) the above described ghost images. Prior to describing such embodiments, additional details of an exemplary display engine 204 are initially described with reference to FIG. 3A.

Figure 3A:
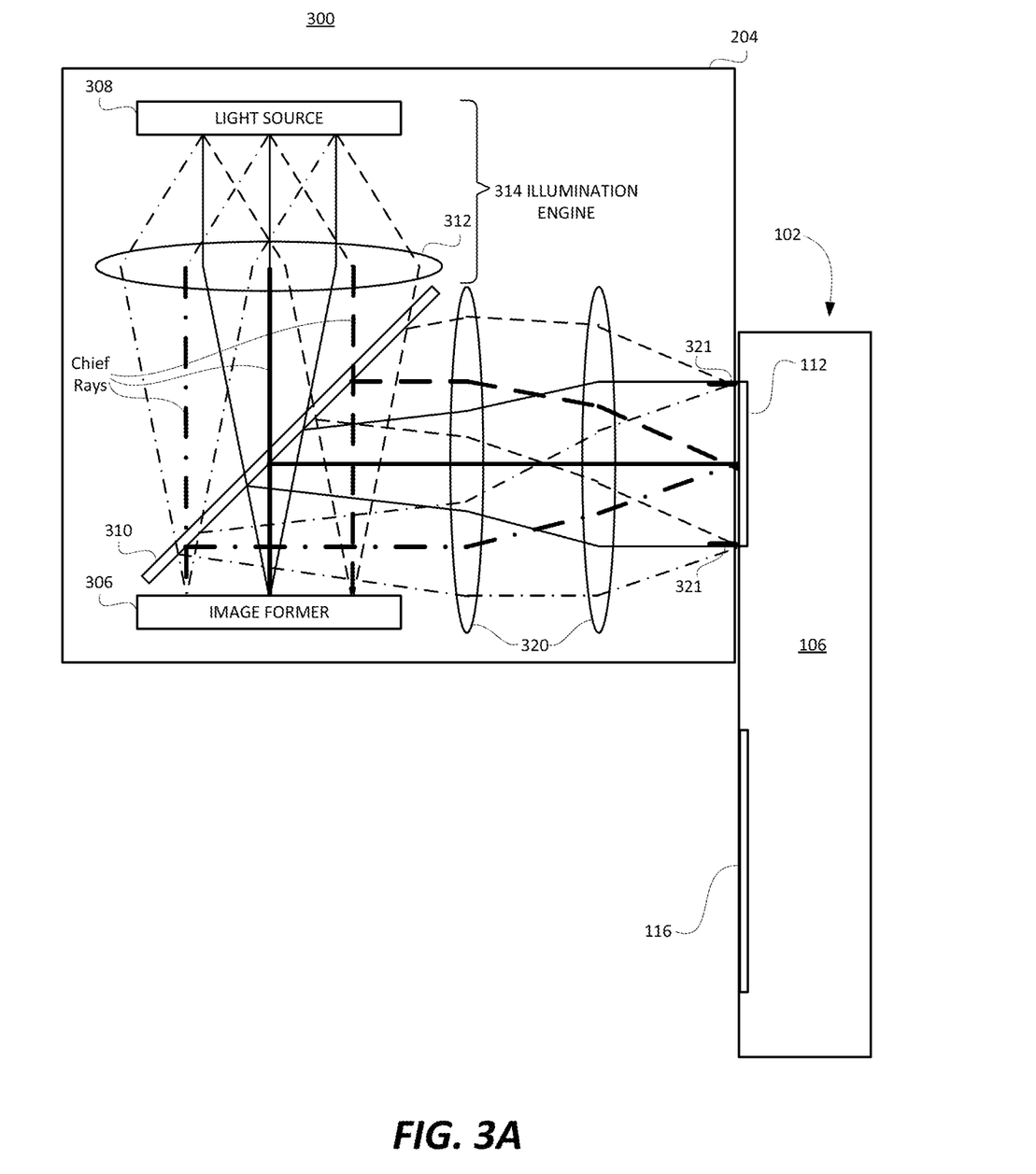
FIG. 3A is a side view that is similar to FIG. 2, but shows exemplary details of the display engine of an exemplary telecentric imaging system.

FIG. 3A shows an exemplary see-through, mixed reality display system 300. In FIG. 3A, and other FIGS, components that are the same as in previously described FIGS. (e.g., FIGS. 1 and/or 2) may be labelled the same, and thus, need not be described again.

In FIG. 3A the display engine 204 is shown as including an image former 306, a light source 308, and a polarizing beam splitter (PBS) 310. The image former 306 can be, e.g., an LCoS microdisplay, but is not limited thereto. The display engine 204 is also shown as including a lens group 312, and a lens group 320. Also shown in FIG. 3A is an exit-pupil 321 of the display engine. The exit-pupil 321 of the display engine 204 can have a diameter that is substantially a same size (e.g., 5 mm or less) as a diameter of the input-pupil of the waveguide 102, but is not limited thereto. It can be appreciated from FIG. 3A that the chief rays go through a center of the exit-pupil 321 of the display engine 204.

Each lens group 312, 320 can include one or more lenses. More specifically, while the lens group 312 is shown as including one lens, it can alternatively include more than one lens. While the lens group 320 is shown as including two lenses, it can include only one lens, or more than two lenses. In FIG. 3A, each of the lenses is represented as a biconvex lens, but that is just for illustration. Each of the lens groups 312 and 320 can include additional and/or alternative type(s) of lens(es), including, but not limited to, one or more plano-convex, positive meniscus, negative meniscus, plano-concave, biconvex and/or biconcave type lens, just to name a few. The display engine 204 can include more or less lens groups than shown in FIG. 3A, depending upon the specific implementation of the display engine 204. Where a lens group includes plurality of lenses, the plurality of lenses of the lens group share a same mechanical axis. The mechanical axis is the centerline of the outer cylindrical edge of a lens, or simply its geometrical axis. The mechanical axis coincides with a rotating axis of a centering machine that edges the lens to its final diameter during the manufacture of a lens. As the term mechanical axis is used herein, if one or more portions of a lens originally having a circular diameter is/are trimmed off the lens (e.g., because the portion(s) are not used or needed to collimate light corresponding to an image, produced by the image former 206, and not used or needed to output the light corresponding to the image from the display engine 204) so as to cause the lens to no longer have a circular diameter, the mechanical axis will be considered to not have changed. In other words, the mechanical axis of a trimmed lens will be considered to be the geometric axis of the lens prior to it being trimmed.

In the embodiment shown in FIG. 3A, the image former 306 is implemented using reflective technology, and thus, can be referred to more specifically as a reflective image former 306. In specific embodiments, the reflective image former 306 is a liquid crystal on silicon (LCoS) microdisplay, in which case the reflective image former 306 can be referred to as a reflective microdisplay. Such an LCoS microdisplay includes a reflective display surface including pixels that can be in an "on" state or an "off" state, as controlled by electronics (not shown).

The light source 308 and the lens group 312 are components of an illumination engine 314, which can also be referred to more succinctly as an illuminator 314. The light source 308 can include light emitting elements that are configured to emit red, green and blue light, but is not limited thereto. The lens group 312 can be configured to collimate the light emitted by the light source 308. The light emitting elements of the light source 308 can be implemented using light emitting diodes (LEDs), or laser diodes, such as vertical-cavity surface-emitting lasers (VCSELs), but are not limited thereto. In FIG. 3A, the lens group 312 of the illumination engine 314 is shown as including a single lens, but as noted above, may actually include more than one lens. It is also possible that the illumination engine 314 includes more than one lens group, with each lens group including one or more lenses.

Still referring to FIG. 3A, the illumination engine 314 emits light that passes through the PBS 310, and is then incident on the reflective image former 306 (and more specifically, pixels thereof) so that the light that is incident on a pixel of the image former 306 has a controlled numerical aperture (e.g., the chief ray is orthogonal to the reflective surface of the image former 306). In accordance with an embodiment, the PBS 310 is configured such that P linearly polarized light is transmitted by the PBS 310 (i.e., passes through the PBS 310) and S linearly polarized light is reflected by the PBS 310. In certain embodiments, if a pixel of the reflective image former 306 is in the "on" state, the "on" pixel converts P linearly polarized light to S linearly polarized light 142 (by rotating the polarization vector by 90 degrees), and reflects the S linearly polarized light back towards the PBS 310. When the S linearly polarized light is incident on the PBS 310 the light is reflected off the PBS 310 in the direction of the waveguide 102. More specifically, such light that is reflected off the PBS 310 is collimated by the lens group 320 and directed toward and incident on the input-coupler 112. The input-coupler 112 couples the light (which corresponds to an image) into the optical waveguide 102. At least a portion of the light (corresponding to the image) that is coupled into the optical waveguide 102 travels, by way of total internal reflection (TIR), from the input-coupler 112 to the output-coupler 116, where the light (corresponding to the image) is coupled out of the optical waveguide 102 so that the image can be viewed by a human eye.

In FIG. 3A, the chief rays (of the light emitted by the illumination engine 314) are illustrated thicker than the other ray traces solely to distinguish the chief rays from the other rays of light. In FIG. 3A, the chief rays pass through the center of the exit-pupil 321, as mentioned above. In FIG. 3A, the chief rays are parallel to the optical axis of the display system 300 in object space. Accordingly, the display system 300 is telecentric and can be referred to as a telecentric imaging system, and the display engine 204 can be referred to as a telecentric display engine 204. It can also be appreciated from FIG. 3A that in a telecentric imaging system the chief rays are perpendicular to the reflective surface of the image former 306. Stated another way, in a telecentric imaging system the chief rays are parallel to the surface normal of the reflective surface of the image former 306.

Figure 3B:
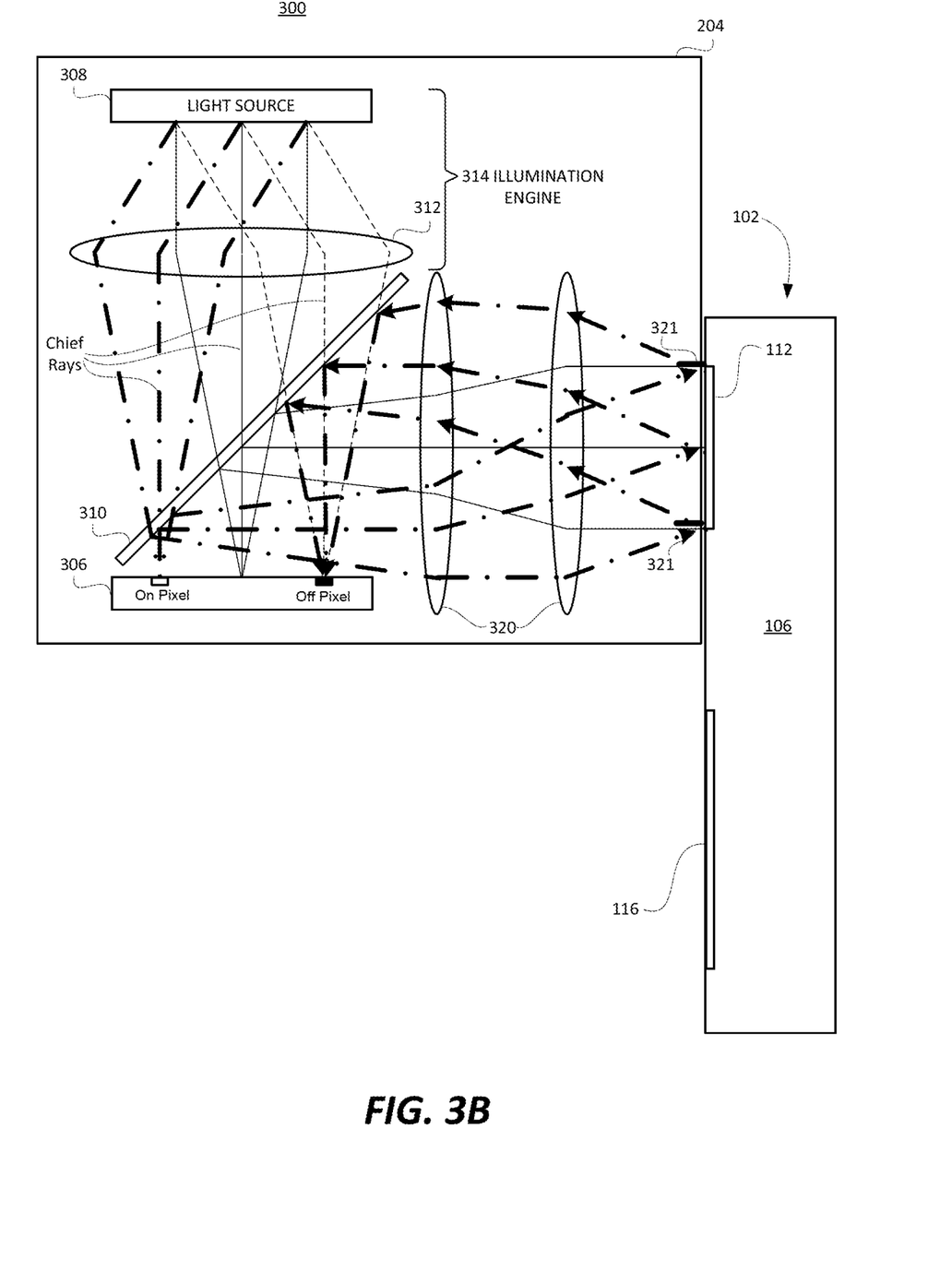
FIG. 3B is a side view that is similar to FIG. 2, and is used to explain how a telecentric imaging system may cause ghost images.
Figure 4:
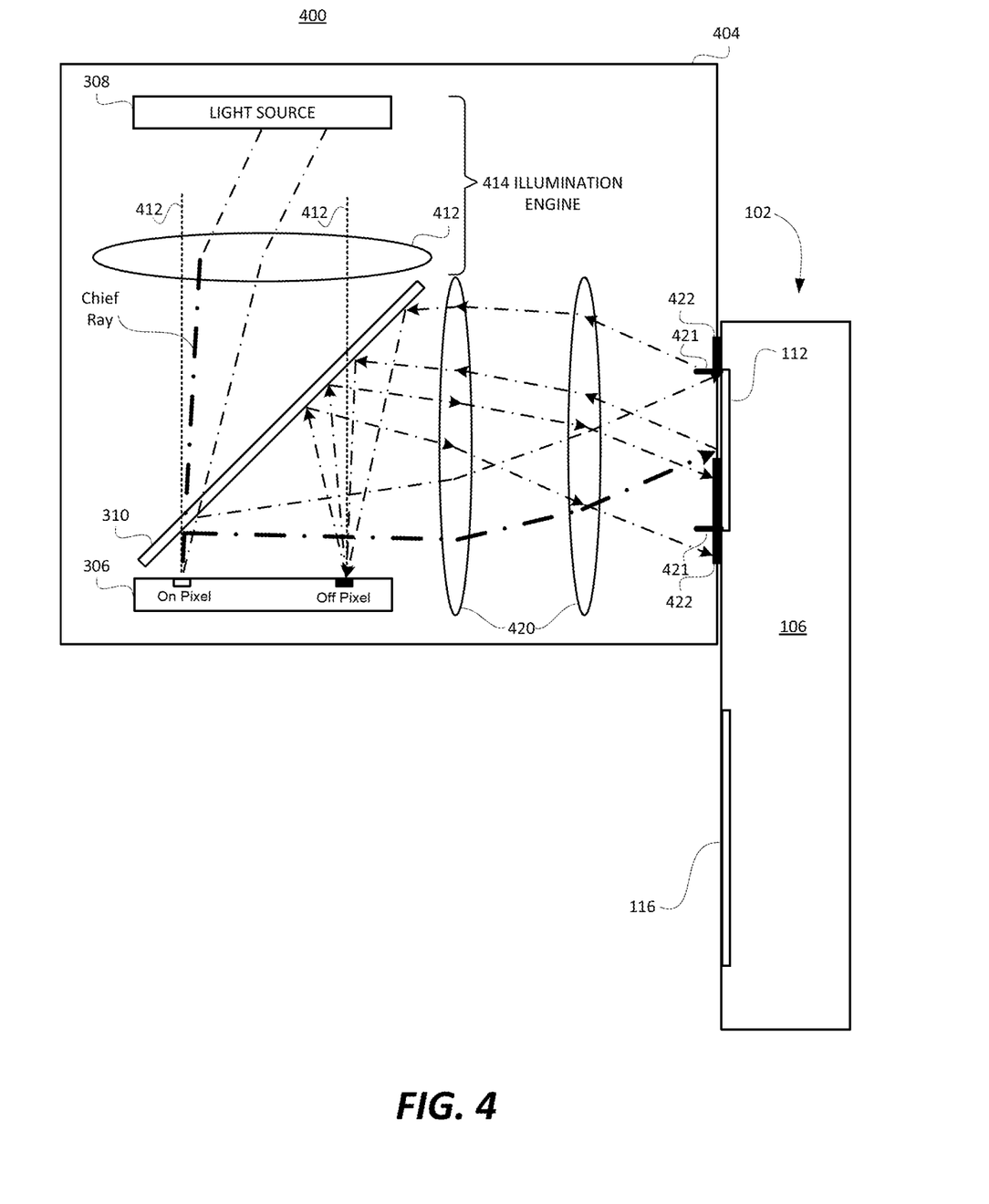
FIG. 4 is a side view showing a display engine of a non-telecentric imaging system that mitigates ghost images in accordance with an embodiment of the present technology.

A majority of the light corresponding to an image that is output from the display engine 204 is diffracted into the optical waveguide 102 by the input-coupler 112, and travels by way of TIR to the output-coupler 116, where the light (corresponding to the image) is coupled out of the optical waveguide 102 so that the image can be viewed by a human eye (e.g., 214 in FIG. 2). However, a portion of the light is reflected-back toward the display engine 204, and may cause ghost images, as noted above. FIG. 3B will now be used to provide some additional details about reflected-back light that may cause ghost images. In FIGS. 3A, 3B and 4, ray traces of light traveling by way of TIR from the input-coupler 112 to the output-coupler 116 of the optical waveguide 102 are not shown, in order to simply the FIGS.

In FIG. 3B, two exemplary pixels of the reflective image former 306 are shown, with one of the pixels being labelled as being "on" and the other labelled as being "off". Such pixels can also be referred to as a pixel in the "off" state, and a pixel in the "on" state. While only two exemplary pixels are represented, the image former 306 would likely include hundreds of thousands of pixels arranged in a matrix. In FIG. 3B, ray trace lines corresponding to the light emitted by the light source 308 are illustrated as thin lines, except for those that are directed toward and incident on the "on" pixel, which ray trace lines are illustrated thicker. The "on" pixel converts P linearly polarized light incident thereon to S linearly polarized light 142 (by rotating the polarization vector by 90 degrees), and reflects the S linearly polarized light back towards the PBS 310. When the S linearly polarized light is incident on the PBS 310 the light is reflected off the PBS 310 in the direction of the waveguide 102. More specifically, light that is reflected off the PBS 310 is collimated by the lens group 320 and directed toward and incident on the input-coupler 112. As previously noted above with reference to FIG. 2, a majority of this light will be diffracted into the optical waveguide 102 by the input-coupler 112. However, as also noted above, a portion of this light is reflected-back toward the display engine 204 due to Fresnel reflections (and potentially due to already in-coupled light being diffractively out-coupled after reflecting off an internal side of the optical waveguide). As shown in thick lines in FIG. 3B, the reflected-back light (which in this example is S linearly polarized light) travels back through the lens group 320, and then reflects off the PBS 310 and is incident on the "off" pixel. The reflected-back light that in incident on the "off" pixel remains S linearly polarized light, and is reflected by the "off" pixel. Since the numerical aperture is centered about the orthogonal chief ray, the exit pupil that is formed by this reflected-back light is substantially the same as would be generated by an on pixel in that location and therefore exits the lens system towards the input-coupler 112 of the optical waveguide 102, resulting in undesirably ghost images.

FIGS. 3A and 3B were used, respectively, to describe an exemplary telecentric imaging system, and to explain how a telecentric imaging system can cause undesirably ghost images. FIG. 4 will now be used to illustrate how a non-telecentric imaging system, according to an embodiment of the present technology, can mitigate and preferably eliminate ghost images. FIG. 4 shows a see-through, mixed reality display system 400 according to an embodiment of the present technology. In FIG. 4, components that are the same as in previously described FIGS. (e.g., FIGS. 1, 2, 3A and/or 3B) may be labelled the same, and thus, need not be described again.

Referring to FIG. 4, a display engine 404 is shown as including an image former 306, a light source 308, and a polarizing beam splitter (PBS) 310. The display engine 404 is also shown as including a lens group 412, and a lens group 420. The light source 308 and the lens group 412 are components of an illumination engine 414, which can also be referred to more succinctly as the illuminator 414. Additionally, the display engine 404 is shown as including an exit-pupil 421 and an aperture stop 422. The image former 306 and the light source 308 are labelled the same as they were in FIGS. 3A and 3B, because they can be the same as in the embodiment of FIGS. 3A and 3B (however they do not have to be the same).

In FIG. 4 the dotted lines labelled 412, which are perpendicular to the reflective surface of the reflective image former 306, are representative of the surface normal to the reflective surface of the image former 306, and can be referred to as the surface normal 412 to the reflective surface of the image former 306 (or more succinctly as the normal 412 to the reflective surface of the image former 306). In the exemplary display engine 204 described above with reference to FIGS. 3A and 3B, the chief rays (of the light emitted by the illumination engine 314) were parallel to the surface normal to the reflective surface of the image former 306 (i.e., perpendicular to the reflective surface of the image former 306). By contrast, in the embodiment of FIG. 4, the illumination engine 414 is configured such that the chief rays (of the light emitted by the illumination engine 414) are not parallel to the surface normal 412 of the reflective surface of the image former 306 (i.e., are not perpendicular to the reflective surface of the image former 306). Rather, in the embodiment of FIG. 4 the chief rays (of the light emitting by the illumination engine 414) are offset at acute angles relative to the surface normal 412 to the reflective surface of the image former 306. Such an angling of the chief rays relative to the reflective surface of the image former 306 can be achieved by appropriate design of the lens group 412, but is not limited thereto. For example, alternatively, or additionally, other types of optical elements of an illumination engine can be used to cause the chief rays (of the light emitting by the illumination engine) to be offset at acute angles relative to the surface normal 412 to the reflective surface of the image former 306. For specific examples, a micro lens array or some other optical microstructure can be used in place of (or in addition) to one or more lens groups. For another example, where the light emitting elements of the light source 308 emit diffused light, an edge coating or some other mechanism can be used to cut off light rays above a specified angle so that the chief rays (of the light emitting by the illumination engine) are offset at acute angles relative to the surface normal 412 to the reflective surface of the image former 306, to help prevent ghost images.

It is noted that the chief ray do not necessarily have to be parallel to the surface normal to the reflective surface of the image former 306 (i.e., perpendicular to the reflective surface of the image former 306) to cause ghost images. Rather, the general condition that results in ghost images is where the numerical aperture (cone of light) is such that the rays reflecting will overlap the incident rays partially or entirely. The telecentric case, an example of which was discussed above with reference to FIG. 3B, is a special case and also represents the worst case for causing ghost images.

In FIG. 4, as was the case in FIG. 3B, two exemplary pixels of the reflective image former 306 are shown, with one of the pixels being labelled as being "on" and the other labelled as being "off". In FIG. 4, two ray trace lines corresponding to the light emitted by the light source 308 and incident on the "on" pixel, are shown, with the one of the two ray trace lines that correspond to the chief ray illustrated thicker. The "on" pixel converts P linearly polarized light incident thereon to S linearly polarized light 142 (by rotating the polarization vector by 90 degrees), and reflects the S linearly polarized light back towards the PBS 310. When the S linearly polarized light is incident on the PBS 310 the light is reflected off the PBS 310 in the direction of the waveguide 102, collimated by the lens group 420, and then directed toward and incident on the input-coupler 112. In the embodiment of FIG. 4 (as was the case in the embodiment described with reference to FIGS. 3A and 3B), while a majority of this light is diffracted into the optical waveguide 102 by the input-coupler 112, a portion of this light is reflected-back toward the display engine 204 due to Fresnel reflections.

The reflected-back light (which in this example is S linearly polarized light) travels back through the lens group 420, then reflects off the PBS 310 and is incident on the "off" pixel, and remains S linearly polarized light. However, in the embodiment of FIG. 4, because the chief ray (of the light emitting by the illumination engine 414 and incident on the "on" pixel) was offset at an acute angle relative to the surface normal 412 to the reflective surface of the image former 306, the S linearly polarized light that is reflected by the "off" pixel is not reflected, back to the input-coupler 112 of the optical waveguide 102. Rather, the the S linearly polarized light that is reflected by the "off" pixel follows a different path back towards the PBS 310, which reflects the light towards the lens group 420 and the waveguide 102 (again following a different path).

In other words, the light emitted by the illumination engine 414, after reflecting off the reflective surface of the image former 306 for a first time, travels a first set of paths toward the input-coupler 112 of the optical waveguide 107. The display engine 404 and the optical waveguide 102 are positioned relative to one another such that a portion of the light corresponding to the image that is directed by the display engine 404 towards the input-coupler 112 of the optical waveguide 102 is reflected-back toward the display engine 404 due to Fresnel reflections and reflect for a second time off the reflective surface of the image former 306. The light corresponding to the image that reflect for the second time off the reflective surface of the image former 306 travel a second set of paths back towards the optical waveguide 102, after being reflected for the second time. The second set of paths are different than the first set of paths, due to the chief rays of the light emitted by the illumination engine 414 towards the reflective surface of the image former 306 being offset by acute angles from the surface normal 412 to the reflective surface of the image former 306.

As can be seen in FIG. 4, when the Fresnel reflected light eventually reaches the portion of the display engine 404 adjacent to the waveguide 102, such light is not incident on the input-coupler 112, and thus, is not diffracted into the waveguide 102 by the input-coupler 112. Rather, when the Fresnel reflected light (after being reflected by the "off" pixel and PBS 310) eventually reaches the portion of the display engine 404 adjacent to the waveguide 102, such light is shown as being incident on the aperture stop 422. The aperture stop 422 absorbs such light, and/or reflects such light in a direction that prevents the light from again being incident on the image former 306. In the embodiment shown in and described with reference to FIG. 4, the display engine 404 has an exit-pupil 421 adjacent to the input-coupler 112 of the optical waveguide 102, and the aperture stop 422 is positioned to block a portion of the exit-pupil 421 of the display engine 404. However, it is not necessary to position the aperture stop at the exact location shown in FIG. 4. Rather, an aperture stop can be positioned at other locations within the display engine, e.g., between the PBS 310 and the lens group 320, or between lenses of the lens group 320, but not limited thereto, so as to prevent light that has been reflected off the image former 306 for a second time from being incident on the input-coupler 112 of the optical waveguide 102. In other words, an aperture stop can be placed at various different locations within the display engine to absorb reflected back light after such reflected back light has been reflected off the image-former 306 for a second time. However, such an aperture stop should be positioned so as to not absorb light that has only reflected off the image former 306 for a first time, which light is intended to be coupled into the waveguide 102 via its input-coupler 112.

In FIG. 4, two exemplary light rays are shown as travelling from the illumination engine 414 to the "on" pixel, with one of the rays being labelled the chief ray. This FIG. has been simplified for illustration purposes. It is noted that this mechanism also works for all field angles in the filed of view of the display system.

In the drawings of FIGS. 3A, 3B and 4, the light corresponding to an image that is reflected by the reflective surface of the image former 306 was shown as being reflected toward the PBS 310, and the PBS 310 was shown as reflecting the light toward the input-coupler 112 of the optical waveguide 102. In certain implementations, one or more optical elements not shown, such a further beam splitter, a fold mirror and/or a birdbath optical element, may be used to steer or fold the light corresponding to the image that is produced by the image former. In such implementations, the use of the illumination engine to emit light towards the reflective surface of the image former such that chief rays of the light emitted by the illumination engine are offset by acute angles from the surface normal to the reflective surface of the image former, and the use of an aperture stop, can be used to reduce and preferably prevent ghost images from occurring due to light that is Fresnel reflected-back from an in-coupler of an optical waveguide back toward a display engine including a reflective image former. In other words, embodiments of the present technology are not limited to the exact set up shown in FIG. 4.

In the FIGS. described herein all lens groups within the display system were shown as sharing a common optical axis that is orthogonal to a center of a field of view of the display system. In alternative embodiments, one or more lens groups within a display system can be decentered and/or tilted relative to an optical axis that is orthogonal to a center of a field of view of the display system.

In FIGS. 1A-1C, 2, 3A, 3B and 4, the major sides 108 and 110 of the waveguide 102 were shown as being planar. However, as noted above, in accordance with certain embodiments the major sides of the waveguide are curved. This would enable, for example, the optical waveguide to implemented as, or as a portion of, a curved visor of a head mounted display.

In accordance with certain embodiment, the optical waveguide 102 is used as an optical combiner that combines the light corresponding to the image that is output from a display engine (e.g., 404) with light corresponding to an external scene. Such an external scene is located on the side of the optical waveguide 202 that is opposite the side on which the user's eye (e.g., 214) is located. Such a configuration allows for an augmented reality environment.

The display engines and optical waveguides described herein can be incorporated into a see-through mixed reality display device system. The same waveguide can be used to steer light of multiple different colors (e.g., red, green and blue) associated with an image from the input-coupler to the output-coupler. Alternatively, three waveguides can be stacked adjacent to each other, with each of the waveguides being used to steer light of a different colors (e.g., red, green or blue) associated with an image from its respective input-coupler to its output-coupler. It would also be possible that one waveguide handle light of two colors (e.g., green and blue) and another waveguide handles light of a third color (e.g., red). Other variations are also possible.

Figure 5:
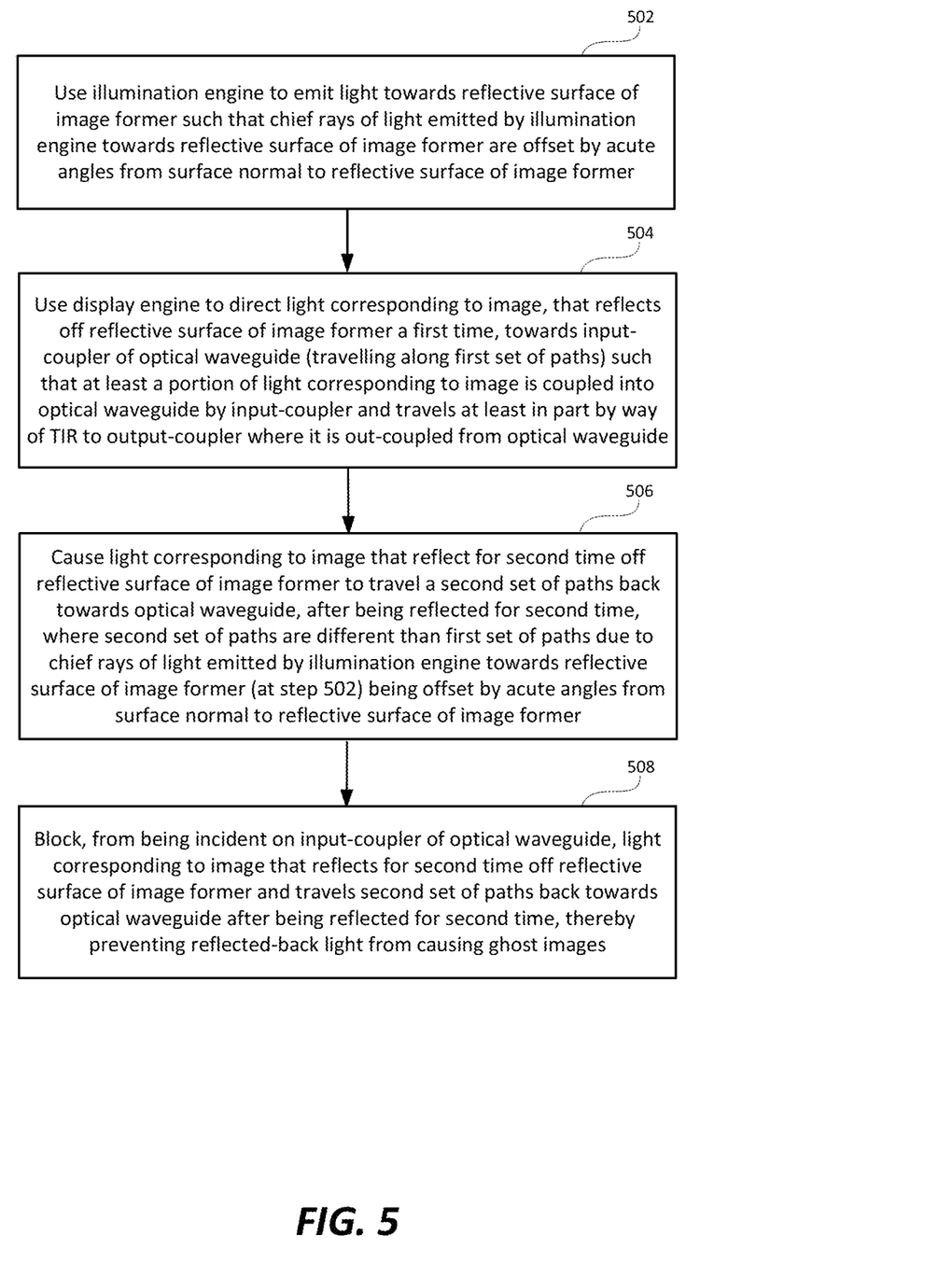
FIG. 5 is a high level flow diagram that is used to summarize methods according to certain embodiments of the present technology.

FIG. 5 is a high level flow diagram that is used to summarize methods according to certain embodiments of the present technology. Such methods, which are for use with display device system that includes a display engine (e.g., 404) and an optical waveguide (e.g., 102), can be used to prevent a ghost image from being formed by light corresponding to an image that is reflected-back toward the display engine from the optical waveguide. The optical waveguide includes at least an input-coupler and an output-coupler. The display engine includes at least an image former and an illumination engine, wherein the image former includes a reflective surface having a surface normal thereto.

Referring to FIG. 5, step 502 involves using the illumination engine to emit light towards the reflective surface of the image former such that chief rays of the light emitted by the illumination engine towards the reflective surface of the image former are offset by acute angles from the surface normal to the reflective surface of the image former.

Step 504 involves using the display engine to direct light corresponding to an image, that reflects off the reflective surface of the image former, towards the input-coupler of the optical waveguide such that at least a portion of the light corresponding to the image is coupled into the optical waveguide by the input-coupler and travels at least in part by way of total internal reflection (TI R) to the output-coupler where the least a portion of the light corresponding to the image is out-coupled from the optical waveguide. More specifically, the light emitted by the illumination engine, after reflecting off the reflective surface of the image former for a first time, travels a first set of paths toward the input-coupler of the optical waveguide. The display engine and the optical waveguide are positioned relative to one another such that a portion of the light corresponding to the image that is directed by the display engine towards the input-coupler of the optical waveguide is reflected-back toward the display engine due to Fresnel reflections and reflect for a second time off the reflective surface of the image former.

Step 506 involves causing the light corresponding to the image that reflect for the second time off the reflective surface of the image former to travel a second set of paths back towards the optical waveguide, after being reflected for the second time. The second set of paths are different than the first set of paths, due to the chief rays of the light emitted by the illumination engine towards the reflective surface of the image former being offset by the acute angles from the surface normal to the reflective surface of the image former.

Step 508 involves blocking, from being incident on the input-coupler of the optical waveguide, the light corresponding to the image that reflects for the second time off the reflective surface of the image former and travels the second set of paths back towards the optical waveguide after being reflected for the second time, thereby preventing the reflected-back light from causing ghost images. Step 508 can be performed using an aperture stop (e.g., 422). For example, the display engine has an exit-pupil (e.g., 421) adjacent to the input-coupler of the optical waveguide, and the blocking at step 508 can be performed using an aperture stop (e.g., 422) that blocks a portion of the exit-pupil (e.g., 421) of the display engine (e.g., 404). As noted above, there are other locations where an aperture stop can be positioned to prevent ghost images.

Embodiments of the present technology described above with reference to FIGS. 4 and 5 provide for non-telecentric systems wherein chief rays of the light emitted by an illumination engine towards a reflective surface of an image former are offset by acute angles from the surface normal to the reflective surface of the image former in order to avoid ghost images without significantly increasing the design complexity compared to a telecentric system.

In comparison to the exemplary telecentric imaging system described above with reference FIGS. 3A and 3B, the non-telecentric imaging system described above with reference to FIG. 4 will have a numeric aperture that is slightly less than half a numeric aperture than the telecentric imaging system of FIGS. 3A and 3B, wherein slightly less than half means within ten percent of half. For example, assuming the telecentric imaging system of FIGS. 3A and 3B had an f-number of 4, then the non-telecentric imaging system of FIG. 4 may have an f-number of slightly less than 2, e.g., of about 1.8 or 1.9.

The methods described with reference to FIG. 5 can be performed using an optical waveguide that includes at least an input-coupler and an output-coupler. The optical waveguide may also include an intermediate-component. Where the optical waveguide includes an input-coupler (e.g., 112) and an output-coupler (e.g., 116), but not an intermediate-component (e.g., 114), the input-coupler will direct light that it couples into the optical waveguide toward the output-coupler, and the output-coupler may provide one of horizontal or vertical pupil expansion. Where the optical waveguide also includes an intermediate-component, then the input-coupler can be used to direct the light corresponding to the image (that is coupled into the bulk-substrate of the optical waveguide) toward the intermediate-component. The intermediate-component can be used to perform one of horizontal or vertical pupil expansion and to direct the light corresponding to the image towards the output-coupler, and the output-coupler can be used to perform the other one of horizontal or vertical pupil expansion. Additional details of the methods summarized with reference to FIG. 5 can be appreciated from the above discussion of FIGS. 1A, 1B, 10, 2, 3A, 3B and 4.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A see-through, mixed reality display system, comprising: an optical waveguide including an input-coupler and an output-coupler;
   a display engine including an image former, a light source, and a lens group;
   the image former including a reflective surface having a surface normal thereto; and
   the light source and the lens group configured to emit light towards the reflective surface of the image former such that chief rays of the light emitted by the light source and the lens group towards the reflective surface of the image former are offset by acute angles from the surface normal to the reflective surface of the image former;
   wherein the display engine is configured to direct light corresponding to an image, that reflects off the reflective surface of the image former, towards the input-coupler of the optical waveguide such that at least a portion of the light corresponding to the image is coupled into the optical waveguide by the input-coupler and travels at least in part way of total internal reflection (TIR) to output-coupler where the least a portion of the light corresponding to the image is out-coupled from the optical waveguide.

2. The display system of claim 1, wherein the image former, the light source and the optical waveguide collectively provide a non-telecentric imaging display system.

3. The display system of claim 1, wherein:
   the light emitted by the light source and the lens group, after reflecting off the reflective surface of the image former for a first time, travels a first set of paths toward the input-coupler of the optical waveguide;
   the display engine and the optical waveguide are positioned relative to one another such that a portion of the light corresponding to the image that is directed by the display engine towards the input-coupler of the optical waveguide is reflected-back toward the display engine due to Fresnel reflections and reflect for a second time off the reflective surface of the image former;
   the light corresponding to the image that reflect for the second time off the reflective surface of the image former travel a second set of paths back towards the optical waveguide, after being reflected for the second time; and
   the second set of paths are different than the first set of paths, due to the chief rays of the light emitted by the light source and the lens group towards the reflective surface of the image former being offset by the acute angles from the surface normal to the reflective surface of the image former.

4. The display system of claim 3, wherein the display engine further comprises an aperture stop that blocks, from being incident on the input-coupler of the optical waveguide, the light corresponding to the image that reflects for the second time off the reflective surface of the image former and travels the second set of paths back towards the optical waveguide after being reflected for the second time, thereby preventing the reflected-back light from causing ghost images.

5. The display system of claim 4, wherein:
   the display engine has an exit-pupil adjacent to the input-coupler of the optical waveguide; and
   the aperture stop blocks a portion of the exit-pupil of the display engine.

6. The display system of claim 1, wherein the display engine further comprises one or more second lens groups and/or one or more other optical elements that are configured to cause the chief rays of the light emitted by the light source and the lens group towards the reflective surface of the image former to be offset by the acute angles from the surface normal to the reflective surface of the image former.

7. The display system of claim 1, further comprising:
   a polarizing beam splitter (PBS) positioned between the light source and the image former; and one or more second lens groups between the PBS and an exit-pupil of the display engine.

8. The display system of claim 1, wherein all lens groups within the display system share a common optical axis that is orthogonal to a center of a field of view of the display system.

9. The display system of claim 1, wherein one or more lens groups within the display system the lens group is at least one of decentered or tilted relative to an optical axis that is orthogonal to a center of a field of view of the display system.

10. The display system of claim 1, wherein:
    the image former comprises a liquid crystal on silicon (LCoS) microdisplay; and
    the reflective surface of the image former comprises a plurality of pixels that can each be selectively and individually turned on or off.

11. For use with display device system that includes a display engine and an optical waveguide, a method for preventing ghost images from being formed by light corresponding to an image that is reflected-back toward the display engine from the optical waveguide, wherein the optical waveguide includes an input-coupler and an output-coupler, wherein the display engine includes an image former, a light source, and a lens group, and wherein the image former includes a reflective surface having a surface normal thereto, the method comprising:

using the light source and the lens group to emit light towards the reflective surface of the image former such that chief rays of the light emitted by the light source and the lens group towards the reflective surface of the image former are offset by acute angles from the surface normal to the reflective surface of the image former;

using the display engine to direct light corresponding to an image, that reflects off the reflective surface of the image former, towards the input-coupler of the optical waveguide such that at least a portion of the light corresponding to the image is coupled into the optical waveguide by the input-coupler and travels at least in part by way of total internal reflection (TIR) to the output-coupler where the least a portion of the light corresponding to the image is out-coupled from the optical waveguide.

12. The method of claim 11, wherein the light emitted by the light source and the lens group, after reflecting off the reflective surface of the image former for a first time, travels a first set of paths toward the input-coupler of the optical waveguide; and wherein the display engine and the optical waveguide are positioned relative to one another such that a portion of the light corresponding to the image that is directed by the display engine towards the input-coupler of the optical waveguide is reflected-back toward the display engine due to Fresnel reflections and reflect for a second time off the reflective surface of the image former;

the method further comprising:

causing the light corresponding to the image that reflect for the second time off the reflective surface of the image former to travel a second set of paths back towards the optical waveguide, after being reflected for the second time;

wherein the second set of paths are different than the first set of paths, due to the chief rays of the light emitted by the light source and the lens group towards the reflective surface of the image former being offset by the acute angles from the surface normal to the reflective surface of the image former.

13. The method of claim 12, further comprising:

blocking, from being incident on the input-coupler of the optical waveguide, the light corresponding to the image that reflects for the second time off the reflective surface of the image former and travels the second set of paths back towards the optical waveguide after being reflected for the second time, thereby preventing the reflected-back light from causing ghost images.

14. The method of claim 13, wherein:

the display engine has an exit-pupil adjacent to the input-coupler of the optical waveguide;

the blocking is performed using an aperture stop that blocks a portion of the exit-pupil of the display engine.

15. The method of claim 11, wherein the display engine further includes one or more second lens groups and/or one or more other optical elements, and wherein the using the light source and the lens group comprises:

emitting light from the light source and the lens group in a direction of the one or more second lens groups; and using the one or more second lens groups and/or the one or more other optical elements to cause the chief rays of the light emitted by the light source and the lens group towards the reflective surface of the image former to be offset by the acute angles from the surface normal to the reflective surface of the image former.

16. A display engine for use in a see-through, mixed reality display system that also includes an optical waveguide having an input-coupler and an output-coupler, the display engine comprising:

an image former including a reflective surface having a surface normal thereto; and a light source and a lens group configured to emit light towards the reflective surface of the image former such that chief rays of the light emitted by the light source and the lens group towards the reflective surface of the image former are offset by acute angles from the surface normal to the reflective surface of the image former;

wherein the display engine is configured to direct light corresponding to an image, that reflects off the reflective surface of the image former, towards the input-coupler of the optical waveguide such that at least a portion of the light corresponding to the image is coupled into the optical waveguide by the input-coupler and travels at least in part by way of total internal reflection (TIR) to the output-coupler where the least a portion of the light corresponding to the image is out-coupled from the optical waveguide.

17. The display engine of claim 16, wherein:

the light emitted by the light source and the lens group, after reflecting off the reflective surface of the image former for a first time, travels a first set of paths toward the input-coupler of the optical waveguide;

a portion of the light corresponding to the image that is directed by the display engine towards the input-coupler of the optical waveguide is reflected-back toward the display engine due to Fresnel reflections and reflect for a second time off the reflective surface of the image former;

the light corresponding to the image that reflect for the second time off the reflective surface of the image former travel a second set of paths back towards the optical waveguide, after being reflected for the second time;

the second set of paths are different than the first set of paths, due to the chief rays of the light emitted by the light source and the lens group towards the reflective surface of the image former being offset by the acute angles from the surface normal to the reflective surface of the image former; and the display engine further comprises an aperture stop that blocks, from being incident on the input-coupler of the optical waveguide, the light corresponding to the image that reflects for the second time off the reflective surface of the image former and travels the second set of paths back towards the optical waveguide after being reflected for the second time, thereby preventing the reflected-back light from causing ghost images.

18. The display engine of claim 17, wherein:

the display engine has an exit-pupil adjacent to the input-coupler of the optical waveguide; and the aperture stop blocks a portion of the exit-pupil of the display engine.

19. The display engine of claim 16, further comprising:

a polarizing beam splitter (PBS) positioned between the light source and the image former; and one or more second lens groups between the PBS and an exit-pupil of the display engine.

* * * * *